Patented Dec. 22, 1953

2,663,732

UNITED STATES PATENT OFFICE 2,663,732

(ALKYSULFONAMIDO) ARYLHYDRAZINES

Arnold Weissberger, Rochester, N. Y., assignor to Eastman Kodak Company, Rochester, N. Y., a corporation of New Jersey No Drawing. Application April 29, 1950, Serial No. 159,139

8 Claims. (Cl. 260—556)

This invention relates to (alkylsulfonamido) aryl hydrazines and to a process for preparing the same.

The allergenic properties of phenylhydrazine and other hydrazines is well known. In the art of photography the use of the hydrazines has been limited to a certain extent by the fact that it is practically impossible to prevent the worker from coming into contact with the hydrazines and thereby developing an allergy for the materials generally manifested by dermatitis. Recent advances in photography, to be described in more detail hereinafter, have indicated the importance of the hydrazines and have stimulated efforts to lower the allergenic properties of the hydrazines.

I have now succeeded in preparing (alkylsulfonamido) arylhydrazines and have further found that these (alkylsulfonamido) arylhydrazines possess markedly lower allergenic properties.

The (alkylsulfonamido) arylhydrazines can be represented by the general formula $$H_2NHN-D-NHSO_2R$$

wherein D represents an arylene group of the benzene series, e. g., phenylene, substituted or not, e. g., with alkyl, halogen, etc., and R represents an alkyl group, e. g., methyl, ethyl, n-propyl, isopropyl, n-butyl, isobutyl, etc.

A particularly efficacious group of these new compounds can be represented by the general formula $$H_2NHN-D-NHSO_2R$$

wherein D is as above-mentioned and R represents an alkyl group of from 1 to 4 carbon atoms, e. g., methyl, ethyl, n-propyl, isopropyl, n-butyl, isobutyl, etc.

The water-soluble salts or acid addition products of the (alkylsulfonamido) arylhydrazines comprise a part of my invention, e. g., the (alkylsulfonamido) arylhydrazine chlorides, bromides, sulfates, nitrates, acetates, phosphates, citrates, borates, etc.

(Alkylsulfonamido) arylhydrazines represented by the general formulas are, for example m-(methylsulfonamido) phenylhydrazine

p-(methylsulfonamido) phenylhydrazine

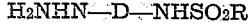

m-(ethylsulfonamido) phenylhydrazine

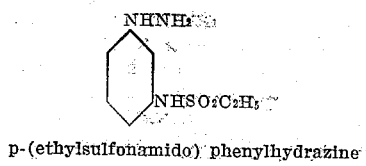

p-(ethylsulfonamido) phenylhydrazine

o-(methylsulfonamido) phenylhydrazine

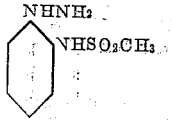

In accordance with my invention the (alkylsulfonamido) phenylhydrazines are prepared by reduction of (alkylsulfonamido) aryldiazonium salts. That is, an (alkylsulfonamido) arylamine, e. g., an m-(alkylsulfonamido) aniline is dissolved in water as the acid salt, particularly the hydrochloride (methods employing the aniline as the phosphate, nitrate, sulfate, etc., can be used but are not equipped), keeping the salt concentration as high as possible at this point and in subsequent steps, because of the high solubility of the final product and the difficulty of isolating the product from dilute solutions. Heat can be supplied to facilitate solution of the (alkylsulfonamido) arylamine salt. The arylamine salt solution is then cooled, to about −5 to −10° C. and diazotization is effected by addition of an excess of sodium nitrite solution which yields a solution of the (alkylsulfonamido) aryldiazonium salt. At this point, any excess of nitrous acid can be destroyed by addition of sulfamic acid. The resulting diazonium salt can be represented by the following general formula:

$$X-N=N-D-NHSO_2R$$

wherein D and R are arylene and alkyl groups respectively, as above-mentioned, and X represents an anion particularly of a mineral acid, e. g., chloride, phosphate, sulfate, nitrate, etc. In a process to be described in more detail hereinafter, wherein after formation of an (alkylsulfonamido) aryldiazonium salt, e. g., the hydrochloride, and the salt is converted to the (alkylsulfonamido) aryldiazosulfonate, X in the general formula represents the anion —SO₃M wherein M is an alkali metal, e. g., sodium or potassium.

A particularly efficacious group of these diazonium salts can be represented by the general formula $$Cl-N=N-D-NHSO_2R$$

wherein D is as above-mentioned and R represents an alkyl group of from 1 to 4 carbon atoms such as above-mentioned.

After standing for a short time, about 5–15 minutes, there is then gradually added to the cold (alkylsulfonamido) aryldiazonium salt solution (0 to −15° C.) two molecular equivalents plus about 10% excess of stannous chloride in cold concentrated hydrochloric acid as a result of which crystals of (alkylsulfonamido) arylhydrazine tin salt or of the (alkylsulfonamido) arylhydrazine hydrochloride soon appear. These crystals are then filtered off, washed with dilute hydrochloric acid solution (about 1 part acid per 1 to 1.5 parts water) at about −15° C. The tin salt can be dried for later use or at once dissolved in water and hydrogen sulfide passed into the solution to decompose the tin salt. The (alkylsulfonamido) arylhydrazine hydrochloride may be treated likewise with hydrogen sulfide to remove traces of tin chlorides and other tin salts. The tin sulfides formed are then filtered off and the filtrate concentrated. Difficulty may be experienced in crystallizing the resultant (alkylsulfonamido) arylhydrazine, however, the methods set forth in detail in the following examples can be used with success to isolate the product either as the free hydrazine or as the salt.

Alternately, after diazotization of the (alkylsulfonamido)-aniline the solution can be added to a solution of alkali metal sulfite, e. g., sodium sulfite, containing an insufficient amount of sodium sulfite (1-molecular equivalent) to reduce the diazonium salt, to form the (alkylsulfonamido)-aryl diazosulfonate suspended in the solution which is then filtered off, dissolved in aqueous acetic acid solution and reduced with zinc dust and acid such as acetic acid to the hydrazinesulfonate which separates out as a white crystalline solid. After filtering off the hydrazinesulfonate, it is dissolved in aqueous hydrochloric acid solution as a result of which the hydrazinesulfonate is hydrolyzed to the hydrazine hydrochloride and can be readily recovered from the solution in a high degree of purity.

In accordance with our invention, the (alkylsulfonamido)-arylhydrazines can be obtained by converting an (alkylsulfonamido)-aniline to the hydrazinesulfonate, as above-mentioned, then suspending the same in absolute alcohol and while heating, passing in gaseous hydrogen chloride for about ½ to 1 hour. No appreciable visible change in the system occurs during this time, and the suspension of the (alkylsulfonamido)-aniline hydrazinesulfonate is thereby converted to a suspension of the corresponding (alkylsulfonamido)-aryl hydrazine hydrochloride from which the same can be obtained in a high degree of purity by filtration.

In accordance with the invention the (alkylsulfonamido) aryl-hydrazines can also be prepared by adding a cold solution of an (alkylsulfonamido) aryldiazonium salt, such as the chloride salt, prepared as above-described, to a cold solution of an alkali metal sulfite, e. g., sodium sulfite to reduce the diazonium salt directly to the corresponding (alkylsulfonamido) aryl-hydrazine hydrochloride. Following this, the product can be obtained in high purity by concentration of the solution and precipitating the product with cold concentrated hydrochloric acid and filtering.

The following examples will serve to further illustrate the preparations of the above hydrazines and the intermediates used in preparing the hydrazines.

*Example 1.—p-(Methylsulfonamido)-phenyl-hydrazine*

A solution of 9.3 g. (0.05 mole) of p-(methylsulfonamido)-aniline in 47 cc. of warm water was treated with 20 cc. of concentrated hydrochloric acid and cooled to 0–5° while stirring. A solution of 3.8 g. (0.055 mole) of sodium nitrite in 10 cc. of water was then added dropwise over a period of 15 minutes. After 15 minutes longer, the excess nitrous acid was destroyed by addition of pulverized sulfamic acid.

The solution was stirred in the ice salt bath while adding an ice-cold solution of 24.8 g. (0.11 mole) of stannous chloride dihydrate in 61 cc. of concentrated hydrochloric acid over a period of 15 minutes, keeping the temperature below 10°. After stirring for ½ hour longer in the cooling bath, the white crystals were collected on a glass cloth and washed with 25 cc. of ice-cold hydrochloric acid solution (1 part concentrated to 1.5 part water). The moist solid was dissolved in 50 cc. of warm water and hydrogen sulfide was passed in to precipitate sulfides of tin. The latter were removed by filtration and the nearly colorless filtrate was concentrated under a vacuum.

The moist residue was slurried with 50 cc. of absolute ethanol and the latter was distilled off under vacuum. The residue was slurried once more with 50 cc. of absolute ethanol, chilled and collected. The white crystals were washed with absolute ethanol and dried, giving 7.2 g. (61%).

A concentration of the mother liquor and washings, re-slurrying with 15 cc. of absolute ethanol and chilling gave an additional 0.5 g. The total yield was thus 7.7 g. (65%).

The starting material for the above process, p-(methylsulfonamido)-aniline, was prepared by reaction of equal parts of p-nitroaniline and methanesulfonyl chloride in dry dioxane, as follows:

A suspension of 138 g. (0.7 mole) of p-nitroaniline in 250 cc. of dry dioxane at 35° was treated with 55.4 g. (0.7 mole) of dry pyridine, giving a nearly complete solution. Methanesulfonyl chloride (80.6 g.; 0.7 mole) in 125 cc. of dry dioxane was added over a 20 minute period while stirring and holding the temperature at 35–40° by running water. The mixture stirred ½ hour longer, stood overnight and was then heated for 3 hours on a steam bath. The cooled reaction mixture was poured into 1 kg. of ice in 2–1. of water. The yellow solid was collected on a 12.5 cm. Buchner funnel, washed with 500 cc. of cold water and then dried. The yield was 140 g., M. P. 167–177°. Recrystallization from 1100 cc. of 95% alcohol gave 113 g., M. P. 178–181°. Concentration of the filtrate gave 18.2 g., M. P. 140°. Extraction of the latter with two 100 cc. portions of hot 10% sodium carbonate solution, chilling, filtering, then acidifying the filtrate, gave 4 g. more product melting at 179–181°.

The total yield of satisfactory material was thus 117 g. (77.5%). A second crystallization (recovery 87%) raises the melting point to 180–2°.

The resultant p-(methylsulfonamido)-nitrobenzene was reduced to p-(methylsulfonamido)-aniline as follows:

A mixture of 50 g. (0.23 mole) of p-(methylsulfonamido)-nitrobenzene, 150 cc. of absolute ethanol and Raney nickel catalyst was treated with hydrogen at 40 p. s. i. and 60°. The catalyst was removed by filtration and the filtrate was chilled. The crystals were collected and dried, giving 32.5 g., M. P. 114–5°. Concentration of the filtrate to 30 cc. and chilling gave 6.0 g. more product, melting at 115–7°. The total crude yield was thus 38.5 g. (89.5%). Recrystallization from 195 cc. of water and 27 cc. of 95% alcohol gave 35.3 g. (82%; 91.6% recovery), melting at 116–117.5°.

The ortho and meta isomer of p-(methylsulfonamido)-phenylhydrazine can be prepared in a similar manner starting from isomeric materials.

*Example 2.—m - (Methylsulfonamido) - phenylhydrazine*

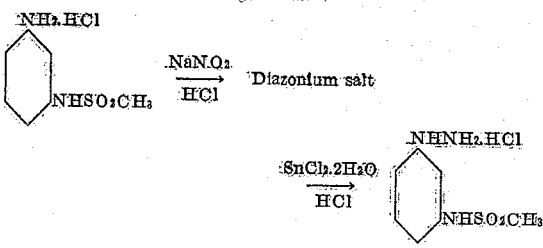

A solution of 2.23 g. (0.01 mole) of m-(methylsulfonamido)-aniline hydrochloride in 9.5 cc. of slightly warm water was treated with 3.0 cc. of concentrated hydrochloric acid and cooled to −10 to −5° while stirring. A solution of 0.76 g. (0.011 mole) of sodium nitrite in 2.0 cc. of water was added dropwise over a period of 10 minutes. After 5 minutes longer, the diazonium solution was treated at −10 to 0° with 4.9 g. (0.022 mole) of stannous chloride dihydrate in 12.3 cc. of cold concentrated hydrochloric acid dropwise over a period of 20 minutes. After standing for ½ hour longer, white crystals formed. These were collected after another 30 minutes and washed with a solution of 10 cc. of concentrated hydrochloric acid and 10 cc. of water at −15°. The crystals were dried over sulfuric acid in a vacuum desiccator. The yield of tin double salt of the hydrazine was 1.5 g., M. P. 195–197°, with softening at about 190°.

The tin salt was decomposed by dissolving it in 15 cc. of water and saturating with hydrogen sulfide. After filtering, the filtrate was concentrated to an oil and repeatedly dissolved in 20 cc. of absolute alcohol and reconcentrated giving a non-crystalline residue weighing 0.85 g., M. P. 80–95°.

One part of this residue was covered with 10 parts of concentrated hydrochloric acid. A nearly complete solution resulted then crystals began to separate. The mixture was cooled for one hour at 10°, and the solid was collected on a suction funnel and dried in a vacuum desiccator over sulfuric acid. The yield was 0.7 part, M. P. 179–181°.

Anal.: Calcd. for $C_7H_{12}ClN_3O_2S$

Calcd.: C, 35.4     Found: C, 35.6
H, 5.1              H, 5.2
N, 17.7             N, 17.8

The starting material, m-(methylsulfonamido) aniline hydrochloride, was prepared as follows:

In a 300 cc. flask, 60.0 g. (0.435 mole) of m-nitroaniline, 17.0 cc. (25.0 g., 0.218 mole) of methanesulfonyl chloride, and 50 cc. of dry benzene are gently boiled under reflux for two hours, then allowed to cool to room temperature. The mixture is transferred with the aid of diethyl ether and dilute aqueous sodium hydroxide to a separatory funnel, shaken, and filtered by suction. The residue is broken up and well washed with ether, dilute sodium hydroxide, water until it dissolves, the entire reaction mixture being distributed between about 800 cc. of water containing 20.0 g. of 97% sodium hydroxide and about 1200 cc. of ether.

The aqueous phase is separated, washed twice with 200 cc. portions of ether swirled with charcoal, filtered by suction, and acidified with 25.0 cc. of concentrated hydrochloric acid. The precipitate is collected by suction filtration, well washed with water, and dried at 50°. The white powder weighs 32–35 g. (81–88% of the theoretical yield from unrecovered starting material) and melts at 162–164°.

The resultant m-(methylsulfonamido)-nitrobenzene was reduced to the m-(methylsulfonamido)-aniline by reacting 15 g. of the former with 3 g. of Raney nickel catalyst in 200 cc. of absolute ethyl alcohol under action of hydrogen at 40 p. s. i./60° for four hours, the resulting pressure drop equaling 99–100% of that calculated.

The solution was then filtered and after concentration of the solution the free amine can be separated out and recrystallized from butyl alcohol and from water to form white square plates M. P. 91–92°. After filtration of the reduction mixture, the filtrate can be saturated with dry hydrogen chloride gas, cooled to 5° C. and the resulting crystals washed with ether and dried. Yield was 12.5 g. (81% of the theoretical yield) of m-(methylsulfonamido)-aniline hydrochloride.

Molecular weight
Calcd. for $C_7H_{11}ClN_2O_2S$ _____ 222.7
Found _____ 223.4
                                              222.8

*Example 3.—p - (Methylsulfonamido) - phenylhydrazine*

As previously mentioned, this hydrazine as well as its isomers and homologues can be prepared as follows:

The p - (methylsulfonamido)-phenyldiazonium salt solution prepared as described in Example 1 from 69 grams (0.37 mole) of p-(methylsulfonamido)-aniline was poured into a solution of 74 grams (0.5 mole) of potassium sulfite in 350 cc. of water at 10° while stirring. After three hours in the ice bath the bright yellow plates were collected and washed with 200 cc. of water. The product was potassium p-(methylsulfonamido)-phenyldiazosulfonate.

The moist potassium p-methylsulfonamidophenyldiazosulfonate was added to a solution of 74 cc. of glacial acetic acid and 185 cc. of water. This mixture was heated below the boiling point while 25 grams of zinc dust was added over a period of 20 minutes. When a colorless reaction mixture was obtained, the zinc was removed by filtration and the filtrate was chilled. The white hair-like needles which formed were collected. On the suction funnel the needles changed to granules. They were washed with 100 cc. of cold water and dried, giving 88.5 g. (75.6%).

A suspension of 11 g. (0.035 mole) of the resulting potassium p-(methylsulfonamido)-phenylhydrazinesulfonate in 50 cc. of absolute ethanol was heated to boiling, then treated with a slow stream of gaseous hydrogen chloride, for ½ hour. The reaction mixture was filtered hot, washed with 50 cc. of absolute ethanol and dried. The yield was 8.1 g. (99%) of p-(methylsulfonamido)-phenylhydrazine hydrochloride.

The procedures of Examples 1, 2 and 3 are applicable to the preparation of the other p-(alkylsulfonamido)-arylhydrazines and salts thereof represented by the general formulas given above, in which cases the appropriate nitroanilines can be selected for reaction with the selected alkyl sulfonylhalide, the alkyl group of which contains preferably from 1 to 4 carbon atoms, e. g., methyl, ethyl, propyl, butyl, etc., followed by reduction of the resulting (alkylsulfonamido)-nitrobenzene, diazotization, and then either reduction of the diazonium salt directly with stannous chloride, sodium sulfite, etc., or conversion of the diazonium salt to the diazosulfonate, thence to the hydrazosulfonate and finally to the (alkylsulfonamido)-arylhydrazine as described.

The hydrazines of the invention are particularly suitable for use in the photographic process of the Ives U. S. patent application, Serial No. 159,150 filed concurrently herewith, now U. S. Patent 2,563,785, granted August 7, 1951. According to that process, an emulsion of the internal latent image type, such as that disclosed in the Davey and Knott U. S. application, Serial No. 82,914, filed March 22, 1949, now U. S. Patent 2,592,250, granted April 8, 1952, is exposed and then developed in a developer containing, in addition to developing agent, one of the hydrazines of our invention. The result is to obtain a direct-positive image in the emulsion layer.

This emulsion is prepared by first forming in the absence of ammonia and in one or more stages silver salt grains consisting at least partly of a silver salt which is more soluble in water than silver bromide, subsequently converting the grains to silver bromide or silver bromo-iodide and if the silver iodide content of the emulsion is less than 6% calculated on the total silver halide, treating such grains with an iodine compound to bring the silver iodide up to at least 6%, ripening preferably in the absence of ammonia and then either washing out some of the soluble salts or washing out the whole of the soluble salts, followed by the addition of soluble salts such as soluble chloride or bromide. An example of an emulsion made in this way is as follows:

*Solution No. 1:*

Inert gelatine _____ grams__ 20  
KCl _____ do____ 20 } at 40° C.  
Water _____ cc.__ 560

*Solution No. 2:*

KCl _____ grams__ 100 } at 45° C.  
Water _____ cc.__ 520

*Solution No. 3:*

AgNO₃ _____ grams__ 195 } at 45° C.  
Water _____ cc.__ 520

*Solution No. 4:*

KBr _____ grams__ 160  
KI _____ do____ 40 } at 45° C.  
Water _____ cc.__ 500

Run solutions Nos. 2 and 3 simultaneously into Solution No. 1 in a vessel, taking 90 seconds to do this. Then ripen for 1 minute at 45° C. Next add Solution No. 4, then ripen for 20 minutes at 45° C. Next add 235 grams of inert gelatine (dry). Then ripen at 45° C. for 15 minutes during which time the gelatine dissolves. Set and shred the emulsion and then wash until free from all soluble bromide and then add about 150 cc. of 10% solution of KCl (by weight), and then add water to make 3½ litres.

An internal latent image type of silver halide emulsion may be defined as one which, when a test portion is exposed to a light intensity scale for a fixed time between 1/100 and 1 second, and developed for 4 minutes at 20° C. in the ordinary, "surface" developer (Developer 1), exhibits a maximum density not greater than ⅕ the maximum density obtained when the same emulsion is equally exposed and developed for 3 minutes at 20° C. in an internal type developer (Developer II). Preferably the maximum density obtained with the surface developer is not greater than 1/10 the maximum density obtained when the same emulsion is developed in the internal type developer. Stated conversely, an internal latent image emulsion, when developed in an internal type developer (Developer II) exhibits a maximum density at least 5, and preferably at least 10, times the maximum density obtained when the same emulsion is exposed in the same way and developed in a surface developer (Developer I).

The process of forming the image in the emulsion is carried out by exposing the internal latent image emulsion layer to an object or image and then placing the exposed emulsion layer directly in a silver halide developing solution containing one or more of the hydrazine compounds, of the present invention or disclosed in the Ives invention. Developing agents suitable for use in the process of my invention include the usual phenolic or aminophenol type developing agents, such as N-methyl-p-aminophenol sulfate, p-benzohydroquinone, catechol, 2-methyl hydroquinone, 2-chlorohydroquinone, p-aminophenol, and pyrogallol. The developing solution should have a pH of from 10 to 13, depending upon the degree of activity of the particular hydrazine compound which it contains, although the preferred range with most hydrazine compounds is from pH 11 to pH 12.

The following is a typical developer composition:

N-methyl-p-aminophenol sulfate _____ g__ 5  
Hydroquinone _____ g__ 10  
Sodium sulfite _____ g__ 75  
Sodium metaborate_____ g__ 30  
Sodium hydroxide _____ g__ 10  
Phenyl hydrazine hydrochloride_____ g__ 0.5  
Water to 1 liter.

An ordinary, surface-type developer, that is, one which develops an image only on the surface of the grains of an internal latent image emulsion, is the following:

*Developer I* p-Hydroxyphenylglycine _____ g__ 10  
Sodium carbonate _____ g__ 100  
Water to 1 liter.

Development time, 4 min. at 20° C.

An internal type developer, that is, one which develops an image inside the grains of an internal latent image emulsion, is the following:

*Developer II*

Hydroquinone _____ g__ 15  
Monomethyl-p-aminophenol sulfate_____ g__ 15  
Sodium Sulfite (anhydrous) _____ g__ 50  
Potassium bromide _____ g__ 10  
Sodium hydroxide _____ g__ 25  
Sodium thiosulfate (crystals)_____ g__ 20  
Water to 1 liter.

Development time, 3 min. at 20° C.

I claim:
1. A water-soluble salt of a hydrazine represented by the formula

H₂NHN—D—NHSO₂R wherein D represents a divalent mononuclear arylene group of the benzene series and R represents an alkyl group of from 1 to 4 carbon atoms.

2. A water-soluble salt of a hydrazine represented by the formula

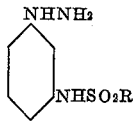

wherein R represents an alkyl group group of from 1 to 4 carbon atoms.

3. A water-soluble salt of a hydrazine represented by the formula

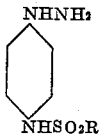

wherein R represents an alkyl group of from 1 to 4 carbon atoms.

4. A water-soluble salt of m-(methylsulfonamido)-phenylhydrazine.

5. A water-soluble salt of p-(methylsulfonamido)-phenylhydrazine.

6. A compound selected from the group consisting of hydrazines represented by the formula

H₂NHN—D—NHSO₂R wherein D represents a divalent mononuclear arylene group of the benzene series, and R represents an alkyl group, and water-soluble salts thereof.

7. m-(Methylsulfonamido) - phenylhydrazine hydrochloride.

8. p-(Methylsulfonamido) - phenylhydrazine hydrochloride.

ARNOLD WEISSBERGER.

References Cited in the file of this patent

UNITED STATES PATENTS

| Number | Name | Date |
|---|---|---|
| 2,424,256 | Schmidt et al. | July 22, 1947 |
| 2,513,826 | Sprung et al. | July 4, 1950 |
| 2,550,661 | Allen | May 1, 1951 |
| 2,618,656 | Thirtle | Nov. 18, 1952 |

OTHER REFERENCES

Beilstein "Handbuch Organischen Chemie," vol. 15 (1932), pp. 67–68.